(12) United States Patent
Brdiczka et al.

(10) Patent No.: US 8,086,548 B2
(45) Date of Patent: Dec. 27, 2011

(54) MEASURING DOCUMENT SIMILARITY BY INFERRING EVOLUTION OF DOCUMENTS THROUGH REUSE OF PASSAGE SEQUENCES

(75) Inventors: Oliver Brdiczka, Mountain View, CA (US); Maurice K. Chu, Burlingame, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 12/774,426

(22) Filed: May 5, 2010

(65) Prior Publication Data

US 2011/0276523 A1     Nov. 10, 2011

(51) Int. Cl.
*G06F 15/18* (2006.01)
(52) U.S. Cl. .................................................. 706/12
(58) Field of Classification Search .................. 706/12
See application file for complete search history.

(56) References Cited

U.S. PATENT DOCUMENTS

| | | | | |
|---|---|---|---|---|
| 6,363,381 B1 * | 3/2002 | Lee et al. | .......................... | 1/1 |
| 6,542,635 B1 * | 4/2003 | Hu et al. | .......................... | 382/173 |
| 6,772,120 B1 * | 8/2004 | Moreno et al. | .................. | 704/256 |
| 6,990,628 B1 * | 1/2006 | Palmer et al. | .................. | 715/234 |
| 7,359,901 B2 * | 4/2008 | Lee et al. | ............................ | 1/1 |

OTHER PUBLICATIONS

H. Lou, "Implementing the Viterbi Algorithm", IEEE Signal Processing Magazine, Sep. 1995, pp. 42-52.*
L. Rabiner, "A Tutorial on Hidden Markov Models and Selected Applications in Speech Recognition", IEEE, Proc. of the, vol. 27, No. 2, Feb. 1989, pp. 257-286.*
A. Bouloutas, G.W. Hart, and M. Schwartz, "Two Extensions of the Viterbi Algorithm", IEEE Trans. on Info. Theory, vol. 37, No. 2, Mar. 1991, pp. 430-436.*
Lou, H-L "Implementing the Viterbi Algorithm Fundamentals and Real-Time Issues for Processors Designers", IEEE Signal Processing Magazine, IEEE Service Center, Piscataway, NJ, vol. 12, No. 5, Sep. 1, 1995, pp. 42-52.

* cited by examiner

*Primary Examiner* — Jeffrey A Gaffin
*Assistant Examiner* — Vincent Gonzales
(74) *Attorney, Agent, or Firm* — Shun Yao; Park, Vaughan, Fleming & Dowler LLP

(57) ABSTRACT

One embodiment of the present invention provides a system for estimating document similarity. During operation, the system selects a collection of documents which includes a first set of passages, constructs a passage-sequence model based on the first set of passages, receives a new document which includes a second set of passages, and determines a sequence of operations associated with the new document in relation to the collection of documents based on the constructed passage-sequence model.

21 Claims, 6 Drawing Sheets

MEASURING DOCUMENT SIMILARITY BY INFERRING EVOLUTION OF DOCUMENTS THROUGH REUSE OF PASSAGE SEQUENCES

BACKGROUND

1. Field

This disclosure is generally related to analysis of document similarities. More specifically, this disclosure is related to measuring document similarities by inferring the evolution of documents through reuse of passage sequences.

2. Related Art

Modern workers often deal with large numbers of documents; some are self-authored, some are received from colleagues via email, and some are downloaded from websites. Many documents are often related to one another as a user may modify an existing document to generate a new document. For example, a worker may generate an annual report by combining a number of previously generated monthly reports. In a further example, a presenter at a meeting may use similar slides modified from an earlier presentation at a different meeting.

Conventional methods for identifying similarities between documents include calculating Levenshtein distance (or editing distance) between strings within the documents, or using certain string alignment algorithms, such as the Smith-Waterman algorithm, to perform sequence alignment for strings within the documents. However, such approaches do not consider possible operations performed by a user when generating a new document from existing documents.

SUMMARY

One embodiment of the present invention provides a system for estimating document similarity. During operation, the system selects a collection of documents which includes a first set of passages, constructs a passage-sequence model based on the first set of passages, receives a new document which includes a second set of passages, and determines a sequence of operations associated with the new document in relation to the collection of documents based on the constructed passage-sequence model.

In a variation on this embodiment, the system further estimates a similarity between the new document and at least one document within the collection of documents based on the determined sequence of operations.

In a variation on this embodiment, the passage-sequence model is a hidden Markov model (HMM). Furthermore, the system generates fingerprints for the first set of passages, wherein at least one fingerprint corresponds to a state of the HMM.

In a further variation, the system determines transition probabilities between states of the HMM.

In a further variation, the transition probabilities are determined based on a sequential relationship associated with the first set of passages.

In a further variation, the system generates fingerprints for the second set of passages, wherein the fingerprints for the second set of passages correspond to an observation sequence of the HMM.

In a further variation, the system calculates passage similarities by comparing the fingerprints of the second set of passages with the fingerprints of the first set of passages.

In a further variation, the system determines emission probabilities for the HMM based on the calculated passage similarities.

In a further variation, the system sets an emission probability for an additional state, which corresponds to creation of a new passage, based on a maximum emission probability of other states belonging to the HMM.

In a further variation, the fingerprints of the first set of passages include two-dimensional visual fingerprints.

In a variation on this embodiment, determining the sequence of operations involves applying a Viterbi algorithm to the HMM.

BRIEF DESCRIPTION OF THE FIGURES

In the figures, like reference numerals refer to the same figure elements.

DETAILED DESCRIPTION

Figure 1A:
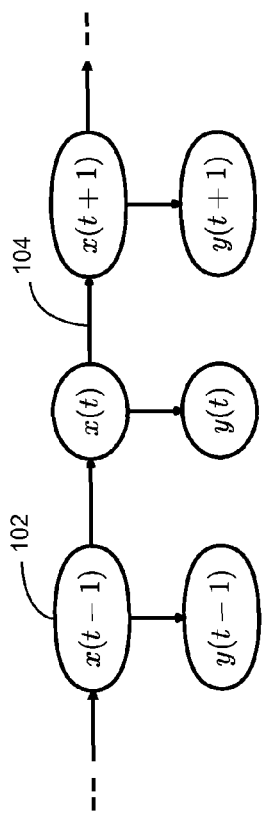
FIG. 1A presents a diagram illustrating the general architecture of an exemplary hidden Markov model (HMM) (prior art).

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system for estimating document similarity by detecting a sequence of operations performed when a given document is generated. During operation, the system selects a collection of documents that includes a number of passages, and constructs a hidden Markov model (HMM) for the collection of documents based on occurrence of the passages. A new document can be viewed as an observable output sequence of the HMM. The system then uses the Viterbi algorithm to calculate the most likely operation sequence for generating the new document. The system further estimates similarity of the new document to one or more of the old documents based on the operation sequence.

HMM of Document Passages

In embodiments of the present invention, documents are viewed as sequences of document passages. Document passages are smaller document units, and sequences of these smaller document units make up the documents. For example, for a text report, document passages can be the individual paragraphs, and the report can be considered as a sequence of paragraphs. Or for a presentation that includes slides, document passages can be the individual slides, and the presentation can be considered as a sequence of slides. Individual passages or a sequence of passages from an existing document may be reused by a user when generating a new document. For example, a user may copy and paste a passage or a modified version of the passage from an existing document to a new document; a user may delete one or more passages from, and/or insert new passages into an existing document; or a user may combine passages from multiple existing documents in order to generate a new document. By examining the possible operations performed by the user for generating the new document, the system allows comparison of the document with multiple documents within a large document collection, and provides a hypothesis of how the document was generated and has evolved over time in the large collection.

Each document passage or its fingerprint can then be viewed as a state, and a hidden Markov model (HMM) can be constructed for a collection of documents. An HMM is a statistical model in which the system being modeled is assumed to be a Markov process with unobserved states. In a regular Markov model, the states are directly visible to the observer, and therefore the state transition probabilities are the only parameters. In an HMM, the states are not directly visible, but outputs dependent on the states are visible. Each state has a probability distribution over the possible output tokens. Therefore, the sequence of tokens generated by an HMM gives some information about the sequence of the states. Given the parameters of an HMM, and a particular output sequence, one can find the state sequence that is most likely to have generated that output sequence. Note that "hidden" refers to the state sequence through which the model passes, not to the parameters of the model.

Figure 1B:
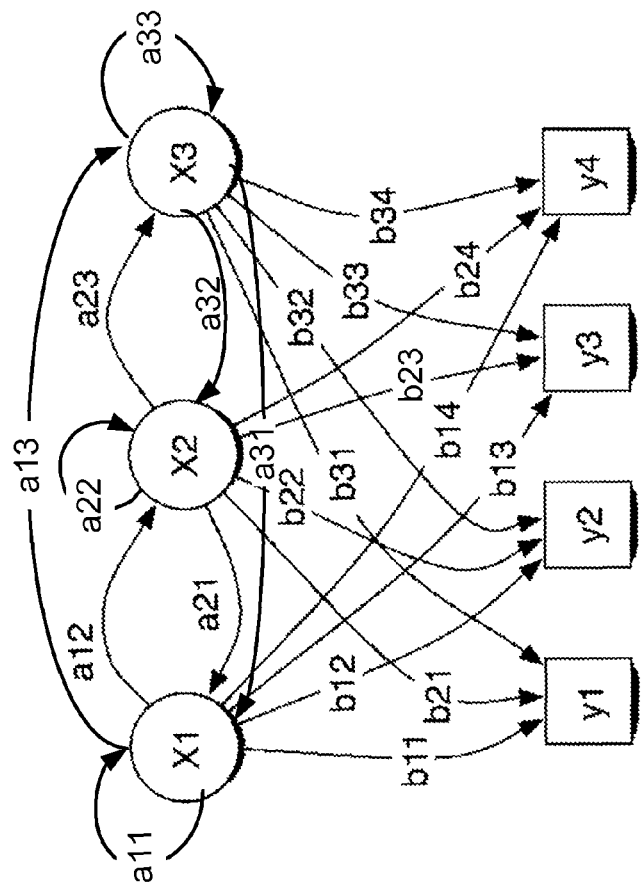
FIG. 1B presents a diagram illustrating the probabilistic parameters of an exemplary case of a stationary HMM having three hidden states and four observations (prior art).

FIG. 1A presents a diagram illustrating the general architecture of an exemplary hidden Markov model (HMM) (prior art). Each oval shape, such as oval 102, represents a random variable that can adopt any of a number of values. The random variable x(t) is the hidden state at time t. The random variable y(t) is the observation at time t. The arrows in the diagram, such as arrow 104, denote conditional dependencies. FIG. 1B presents a diagram illustrating the probabilistic parameters of an exemplary case of a stationary HMM having three hidden states and four observations (prior art). In FIG. 1B, X1, X2, and X3 are possible values of the random variable x of the hidden states (x(t) in FIG. 1A), Y1, Y2, Y3, and Y4 represent possible values of the observation random variable y (y(t) in FIG. 1A), $a_{11}, \ldots, a_{33}$ are the state transition probabilities between the hidden states, and $b_{11}, \ldots, b_{34}$ are the output (or emission) probabilities. The more general, non-stationary HMM would involve the state transition probabilities a and emission probabilities b depending on time t.

Figure 2:
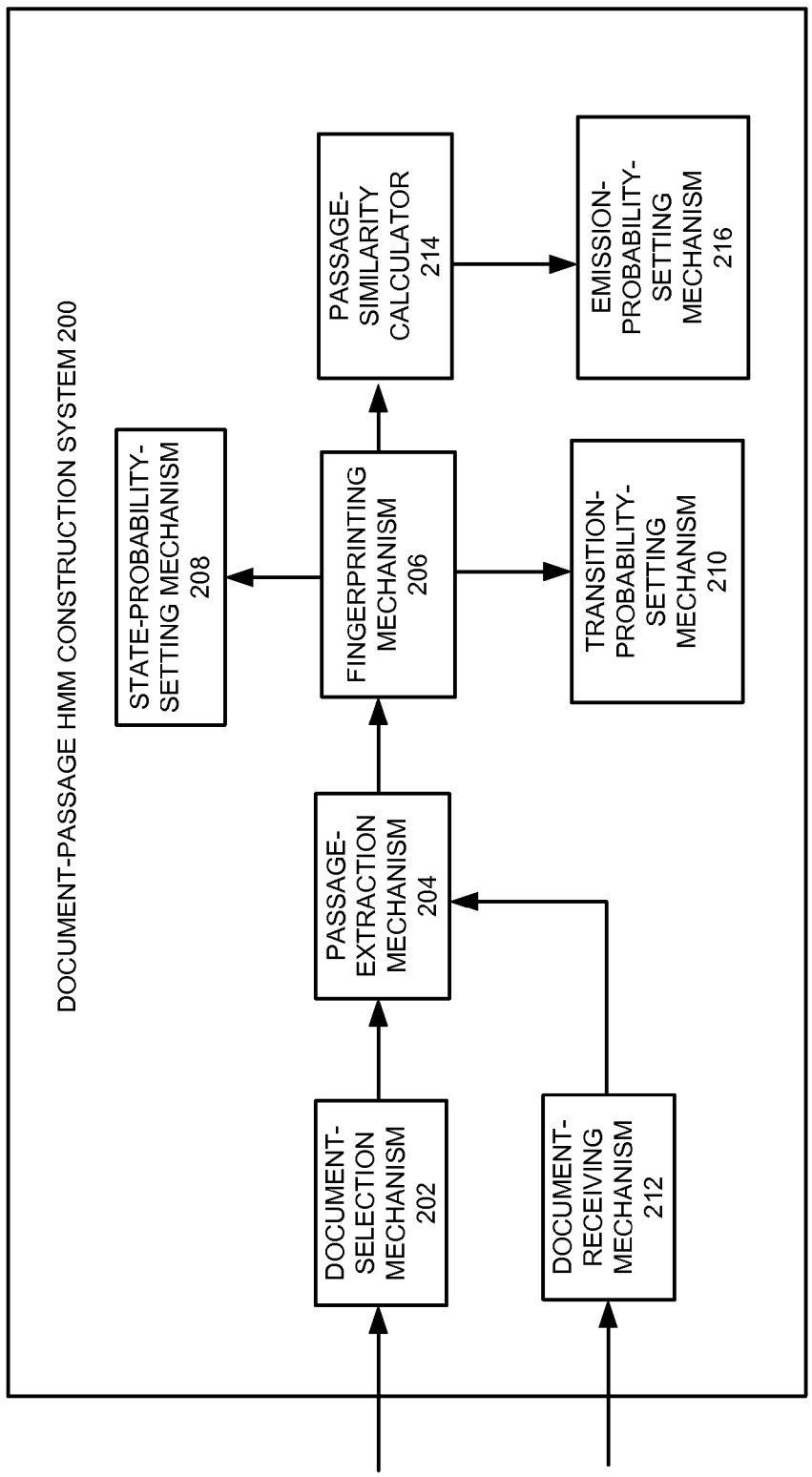
FIG. 2 presents a diagram illustrating a document-passage HMM construction system in accordance with an embodiment of the present invention.

FIG. 2 presents a diagram illustrating a document-passage-HMM-construction system in accordance with an embodiment of the present invention. Document-passage HMM construction system 200 includes a document-selection mechanism 202, a passage-extraction mechanism 204, a fingerprinting mechanism 206, a state-probability-setting mechanism 208, a transition-probability-setting mechanism 210, a document-receiving mechanism 212, a passage-similarity calculator 214, and an emission-probability-setting mechanism 216.

During operation, document-selection mechanism 202 selects a collection of documents for constructing the HMM. The collection of documents can be selected manually by a user, or the collection of documents can be automatically selected by the system using user-defined criteria. For example, the document collection can include all files within a designated folder, or it can include all Microsoft® Word or PowerPoint® (registered trademarks of Microsoft Corporation of Redmond, Wash.) files from a hard drive. In addition, the system can select files having a same author, files having similar names, or files that are time-stamped during a given time period. The document type can be any type that contains text, symbols, figures, and/or any combination thereof. The selected documents in the collection can also have any type of file format, such as plain text, Microsoft® Word (registered trademark of Microsoft Corporation of Redmond, Wash.), HyperText Markup Language (HTML), Portable Document Format (PDF), etc.

The collection of documents is sent to passage-extraction mechanism 204 configured to extract document passages, which are smaller units of the documents. In one embodiment, the document passages can include individual slides of a PowerPoint® (registered trademark of Microsoft Corporation of Redmond, Wash.) presentation, individual paragraphs of a Microsoft® Word (registered trademark of Microsoft Corporation of Redmond, Wash.) file, and/or individual functions of an object-oriented computer program.

The extracted document passages are then sent to fingerprinting mechanism 206, which is configured to generate passage fingerprints. In one embodiment, a text-based fingerprint is generated for each passage. A 2-dimensional (2D) visual fingerprint can also be generated for each passage. To generate the 2D visual fingerprint, the system identifies 2D visual patterns of a given document. The fingerprint of each document passage corresponds to one state of the constructed HMM. To control the scale of an HMM representing a large collection of documents, document fingerprints can also be clustered to form a smaller representative set, where each cluster corresponds to a state. An unsupervised clustering method, such as machine learning, can be used for clustering document fingerprints.

The initial probabilities of the states for the constructed HMM are set by state-probability-setting mechanism 208. The initial probability of a state defines the likelihood of the appearance of the state. Depending on whether the complete, ordered matching of documents passages is needed, state-probability-setting mechanism 208 can set the initial probabilities (the likelihood of the appearance of a state) of the states accordingly. In one embodiment, the initial probabilities of the states can be set according to a decreasing bell curve based on the order of the document passages as they appear in the documents. In such a case, the system assumes that the first passages of each document in the collection have the same initial probability. In a further embodiment, the system neglects the order of the document passages, and state-probability-setting mechanism 208 sets a uniform initial probability over all states (passages).

The transition probabilities $a_{ij}$ (such as $a_{12}$, as shown in FIG. 1) between the states of the HMM are set by transition-probability-setting mechanism 210. In one embodiment, the transition probabilities are set to be a bell curve. For a given passage state, the peak of the curve occurs when the transition corresponds to a transition from the passage to its immediately following document passage. Transition probabilities from a passage to other following passages decrease exponentially as the distance between passages increases. For example, the transition probability from a first passage of a document to its immediately following passage (namely, the second passage of the document) can be set at a relatively large number, such as 0.8, whereas the transition probability from the same first passage to the third passage of the document can be set at a much lower number, such as 0.2. Other shapes of curve, as long as it is decreasing, are also possible. In one embodiment, the transition probabilities decrease linearly as the distance between two passages increases.

When setting the transition probabilities between the states, transition-probability-setting mechanism 210 also takes into account the document-association of the passages. For passages sharing the same document-association (meaning they appear in the same document), transition-probability-setting mechanism 210 sets the transition probabilities between them to be slightly higher than the probabilities of all transitions involving passages having different document-associations.

By setting the transition probabilities non-uniformly (based on passage distance and document-association), the system accounts for the sequential nature of document passages and the fact that the likelihood of re-using several passages from one document can be rather high. To prevent exclusion of certain state transitions, which can happen if a transition probability is set at zero, the system uses a smoothing technique, such as Laplace smoothing, to avoid the occurrence of a zero probability. In one embodiment, transition-probability-setting mechanism 210 sets all transition probabilities below a predetermined threshold to the threshold value. In the meantime, probabilities of the highly likely state transitions are shaved off slightly to ensure that the sum of all transition probabilities still equals 1. In a further embodiment, the threshold used by the smoothing algorithm is user-configurable. Note that when setting the transition probabilities the constraint that the sum of the transition probabilities over all states equals 1 needs to be satisfied.

Document-receiving mechanism 212 receives a new document for consideration, and sends the new document to passage-extraction mechanism 204 for the extraction of document passages. The extracted passages from the new document are sent to fingerprinting mechanism 206 for the generation of passage fingerprints. The document passage fingerprints of the new document can be considered as an observation sequence generated by the constructed HMM.

Because a document passage may experience modifications before being re-used in the new document, the system needs to compare passages from the new document with known passages in order to determine the emission probability. Such a task can be achieved by passage-similarity calculator 214. Passage-similarity calculator 214 calculates similarities between passages from the new document and passages corresponding to the known HMM states. In one embodiment, the similarities are calculated based on the visual or text-based fingerprint comparisons. If the similarity between a passage within the new document and any passage within the known document collection is less than a predefined threshold, such a passage is considered a new passage. That is, if a passage from the new document bears little resemblance to any passage in the aforementioned collection of documents, the system can treat this passage as a newly created passage.

The calculated similarities are then sent to emission-probability-setting mechanism 216, which sets the emission probabilities (b as shown in FIG. 1) for the HMM states. The emission-probability for a state j can be defined as $b_j(k)$, where k is the observation. In one embodiment, emission-probability-setting mechanism 216 sets the emission probability as the normalized similarity scores obtained by the document fingerprint comparison process (the normalized output of passage-similarity calculator 214). Hence, the emission probability distribution of each state corresponds to the normalized similarity score distribution between the document passage representing the state (state j) and all document passages of the new document (observation k). Note that the emission probability of a new state r corresponding to new document passages can be set to:

$$b_r(k) = 1 - \max_{j \neq r}[b_j(k)].$$

That is, the emission probability of the new state r is set to the remaining probability that the observation is not generated by any of the states (except state r) of the HMM. Note that, similar to that of the transition probability, when setting the emission probability, the constraint that the sum of the emission probabilities over all observed states equals 1 also needs to be satisfied.

Figure 3:
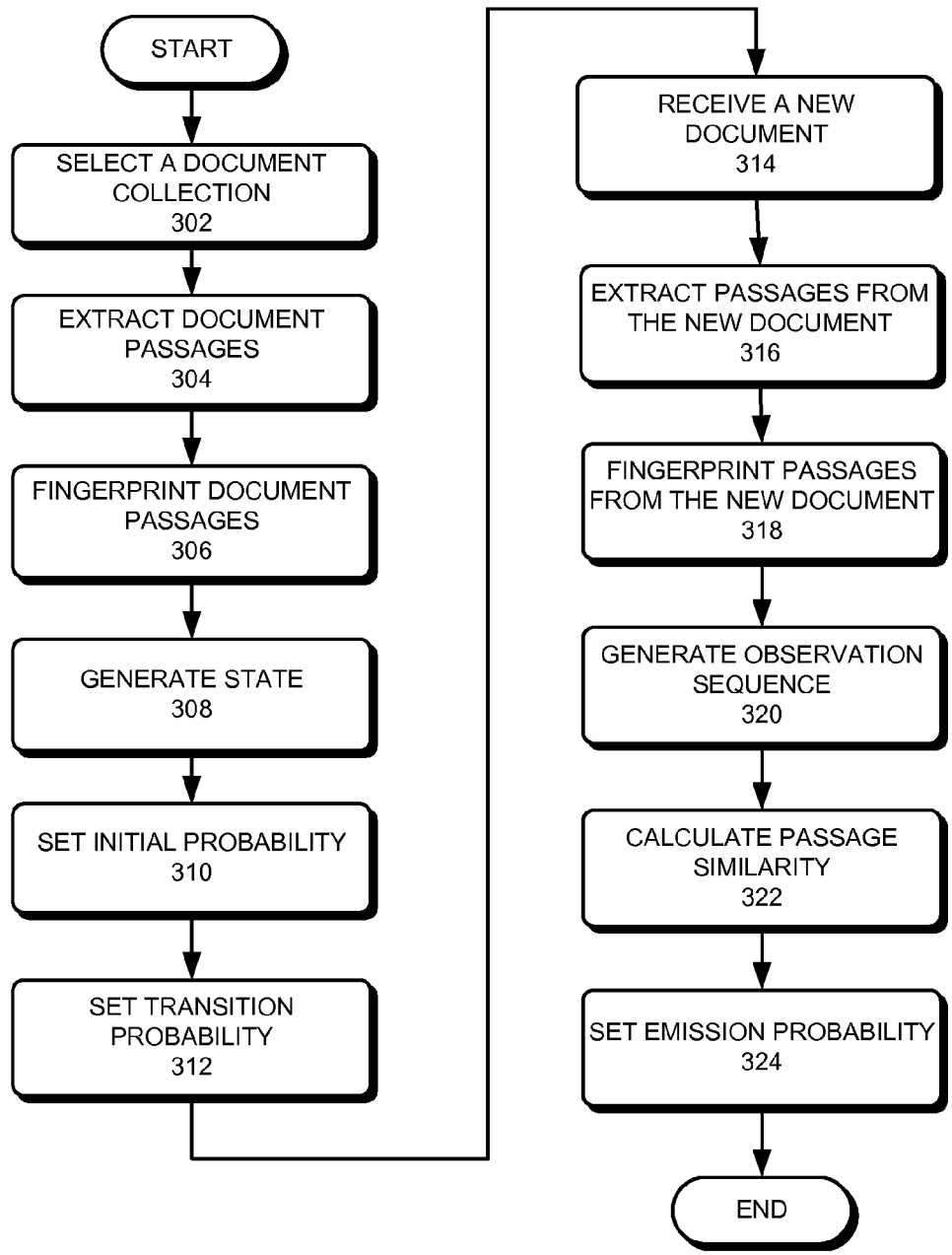
FIG. 3 presents a flowchart illustrating the process of constructing an HMM based on document passages of a document collection in accordance with an embodiment of the present invention.

FIG. 3 presents a flowchart illustrating the process of constructing an HMM based on document passages for a document collection in accordance with an embodiment of the present invention. During operation, the system selects a document collection (operation 302). The documents within such a collection can be any type, such as reports, presentations, and computer programs. The system then extracts document passages from the collection (operation 304). Document passages are sub-units of a document. If the document is a report, the passages can be individual paragraphs; if the document is a presentation, the passages can be individual slides. The system generates fingerprints for the extracted document passages (operation 306), and sets the fingerprints or clusters of fingerprints as states for the constructed HMM (operation 308). The system then sets initial probabilities for individual states (operation 310), and sets transition probabilities between states (operation 312).

Subsequently, the system receives a new document (operation 314), and extracts passages from the new document (operation 316). The system fingerprints the extracted passages from the new document (operation 318), and sets the fingerprints of the new document as an observation sequence that has been output by the constructed HMM (operation 320). The fingerprints of the new document and the fingerprints of the previous collection of documents are compared, and passage similarities are calculated (operation 322). In one embodiment, the passage similarities are calculated based on simple one-to-one visual/text-based fingerprint comparison, which identifies 2D visual patterns in the content of the documents. To complete the construction of the HMM, the system sets emission probabilities based on the calculated similarity (operation 324). If the similarity of a passage in the new document to any passage in the document collection is less than a threshold, the passage is considered to be a new state. The emission probability corresponds to a new state is set as the remaining probability that the observation is not generated by any of the states of the HMM (except for the new state).

Figure 4:
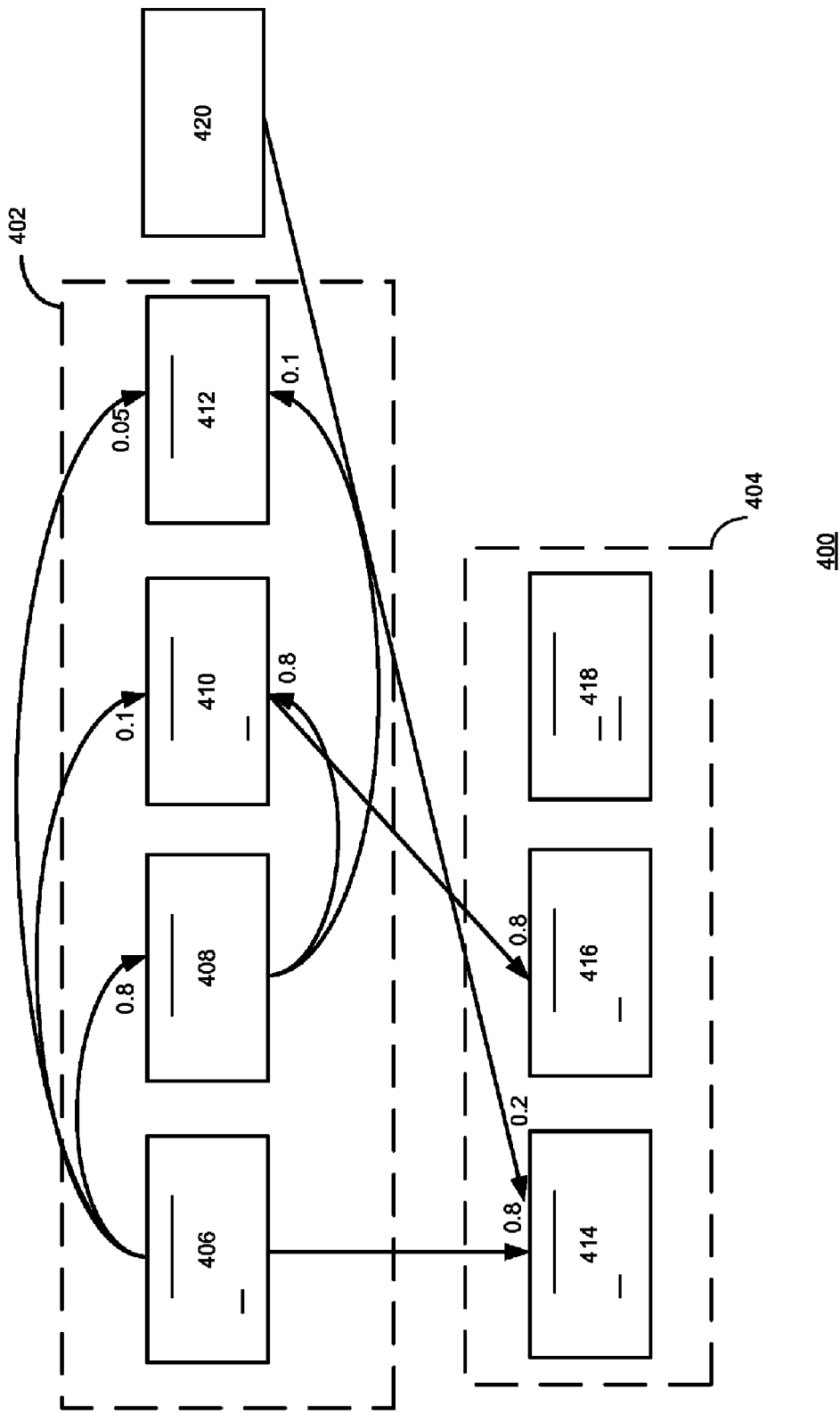
FIG. 4 presents a diagram illustrating an exemplary HMM based on individual slides of presentations in accordance with an embodiment of the present invention.

FIG. 4 presents a diagram illustrating an exemplary HMM based on individual slides of presentations in accordance with an embodiment of the present invention. HMM 400 includes a presentation collection 402 and a new presentation 404. Presentation collection 402 includes a number of slides, such as slides 406-412, each corresponding to an HMM state. New presentation 404 also includes a number of slides, such as slides 414-418, corresponding to an observation sequence. In addition, HMM 400 also includes a new-passage state 420 corresponding to additional states that are not included in presentation collection 402.

For simplicity, the initial probabilities for all slides in presentation collection 402 are set uniformly. The transition probabilities for HMM 400 are set to a bell curve based on the distance between the slides. For example, the probability for the transition from slide 406 and the immediately subsequent slide 408 is set at a relatively high number, such as 0.8, whereas the probabilities for the transitions from slide 406 to slides 410 and 412, which are not immediate neighbors to slide 406, are set at much lower numbers, such as 0.1 and 0.05, respectively. Similarly, the transition probability from slide 408 to slides 410 and 412 are set at 0.8 and 0.1, respectively. Transition probabilities from all other states to new-passage state 420 can be set to the same small number.

Based on the result of the 2D visual/text-based fingerprint comparison, slide 414 in new presentation 404 is 80% similar to slide 406, and slide 416 in new presentation 404 is 80% similar to slide 410. The remaining slide in new presentation 404, slide 418, scores very low based on the similarity calculation, and is considered a new slide. Accordingly, the emission probabilities from slide 406 to slide 414 and from slide 410 to slide 416 are set as the normalized similarity score. Because the maximum similarity score (emission probability) to slide 414 is 0.8, the emission probability from new-passage state 420 to slide 414 in new document 404 is set as 1−0.8=0.2. Other emission probabilities (not shown in the figure) can be also be set based on the normalized similarity score, as long as the summation constraint is satisfied.

Determination of Sequence of Operations

One basic problem of the HMM involves determining an optimal state sequence that generates a given observation sequence. In the context where HMM states represent document passages, such a problem means that, for a given new document (the observation sequence), the system can determine the most likely sequence of operations, such as insertion, deletion, and re-ordering, that a user performed in order to generate that new document from a known collection of documents. Such information provides hypotheses regarding how documents have been generated and how they have evolved over time in a large document collection.

In one embodiment, the system determines the most likely state sequence using a dynamic programming algorithm, such as the Viterbi algorithm. The Viterbi algorithm can be used to find the single best state sequence for a given observation sequence of an HMM. During operation, the algorithm examines all possible paths leading to an observed state and only keeps the one that is most likely.

In the example shown in FIG. 4, after performing the Viterbi algorithm, the system determines that the mostly likely state sequence for the observed sequence (new document 404) is: state 406, state 410, and new-passage state 420. Therefore, to generate new presentation 404 from presentation collection 402, most likely a user re-uses slide 406, deletes slide 408, re-uses slide 410, deletes slide 412, and adds a new slide.

In addition to the Viterbi algorithm, other algorithms for determining the state sequence, such as the forward-backward algorithm, can also be used. The forward-backward algorithm is especially useful when only direct comparison of document recombination is required (e.g., determining which one of two documents is more likely to have been generated from a document collection) because the forward-backward algorithm takes into account all possible recombination paths.

Once the most likely state sequence is determined for a new document, the system can also determine the similarity between the new document and a document within the document collection based on how the new document is generated. For example, in the example shown in FIG. 4, new document 404 re-used two slides from document collection 402; such information can be used to determine the similarity between new document 404 and a document within document collection 402. Note that the one-to-one similarity between the documents A and B is asymmetric by definition. For example, the operations performed by a user (or the generation cost) to generate document A from document B are different from the operations performed to generate document B from document A. In order to obtain a symmetric measure for the one-to-one similarity between documents A and B, the system can average the generation cost by averaging the similarities calculated based on how A is generated from B and how B is generated from A.

Figure 5:
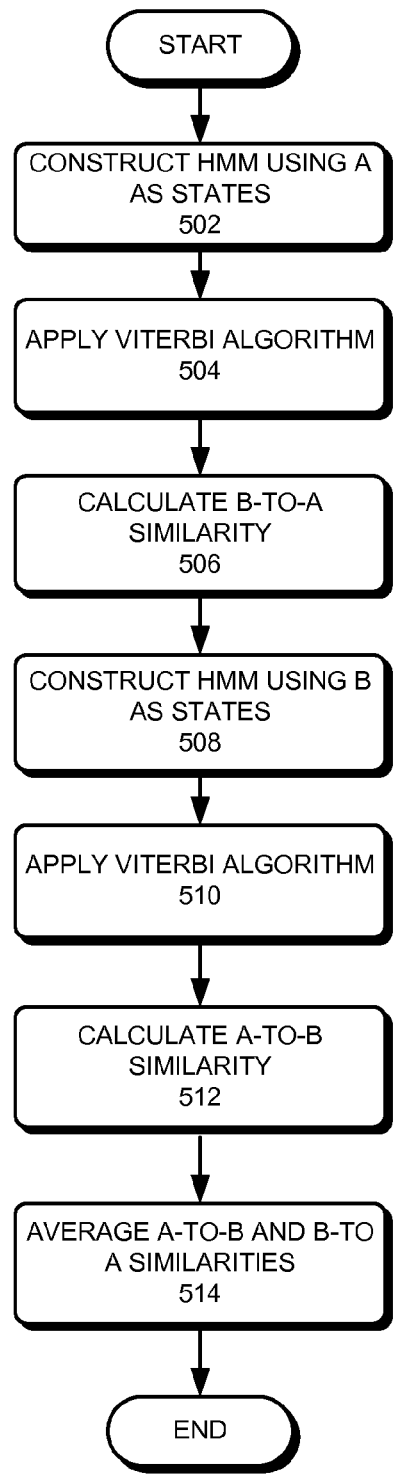
FIG. 5 presents a flowchart illustrating the process of calculating similarities between two documents (A and B) in accordance with an embodiment of the present invention.

FIG. 5 presents a flowchart illustrating the process of calculating similarities between two documents (A and B) in accordance with an embodiment of the present invention. During operation, the system constructs an HMM using passages from document A as states, and passages from document B as observation sequence (operation 502). The system and process used for constructing the HMM is similar to the ones shown in FIGS. 2 and 3. The system then uses the Viterbi algorithm to determine the most likely sequence for generating document B from document A (operation 504), and calculates a B-to-A similarity accordingly (operation 506). Subsequently, the system constructs a different HMM using passages from document B as states, and passages from document A as observation sequence (operation 508). The system performs the Viterbi algorithm on the new HMM to determine the most likely sequence for generating document A from document B (operation 510), and calculates an A-to-B similarity accordingly (operation 512). Afterwards, the system averages the A-to-B and the B-to-A similarities to get the final similarly between documents A and B (operation 514).

In addition to determining document similarities, the ability to find the most likely state sequence of a document can also be used for inferring the ancestry of documents in a document collection. Such information can be provided to a data pedigree system as inputs, which can be used to assess the integrity of documents based on the source material used by the documents.

Exemplary Computer System

Figure 6:
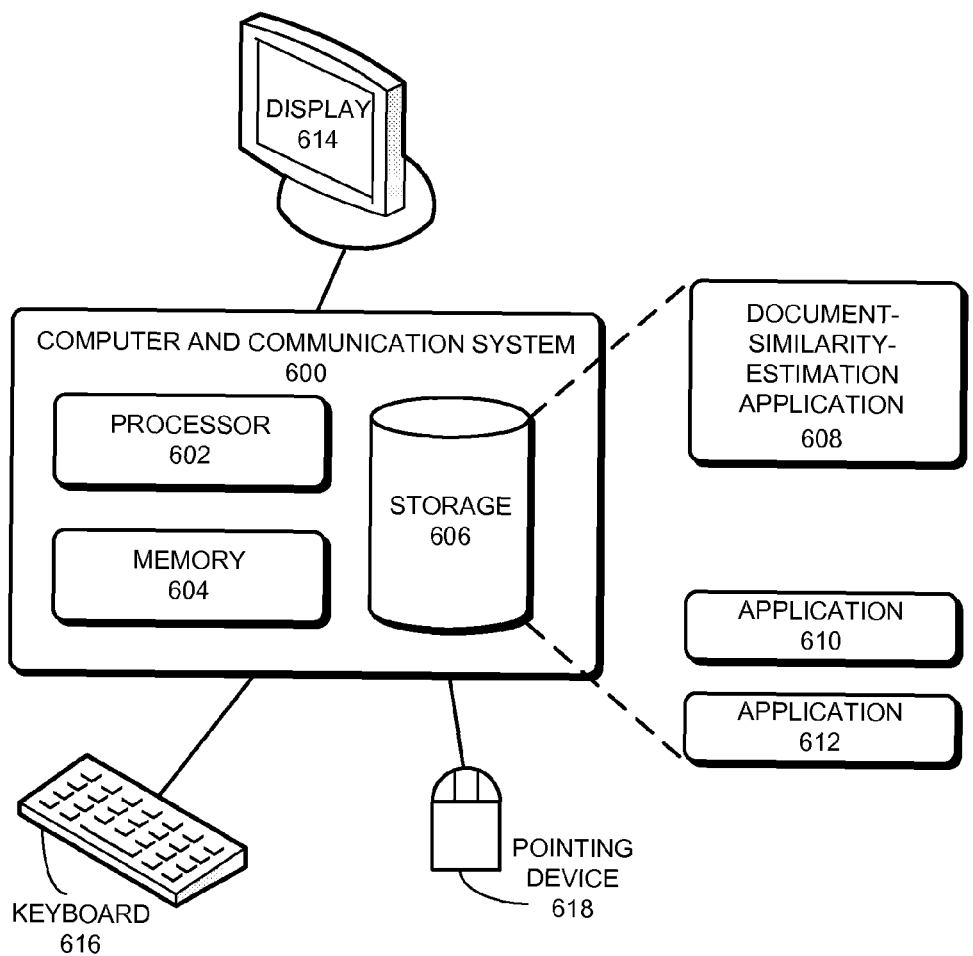
FIG. 6 illustrates an exemplary computer system for estimating document similarity in accordance with one embodiment of the present invention.

FIG. 6 illustrates an exemplary computer system for estimating document similarity in accordance with one embodiment of the present invention. In one embodiment, a computer and communication system 600 includes a processor 602, a memory 604, and a storage device 606. Storage device 606 stores a document-similarity-estimation application 608, as well as other applications, such as applications 610 and 612. During operation, document-similarity-estimation application 608 is loaded from storage device 606 into memory 604 and then executed by processor 602. While executing the program, processor 602 performs the aforementioned functions. Computer and communication system 600 is coupled to an optional display 614, keyboard 616, and pointing device 618.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
    selecting a collection of documents which include a first set of passages;
    constructing a passage-sequence model based on the first set of passages, wherein the passage-sequence model is a hidden Markov model (HMM), wherein constructing the passage-sequence model involves determining transition probabilities between states of the HMM based on a sequential relationship associated with the first set of passages;
    receiving a new document which includes a second set of passages; and
    determining a sequence of operations associated with the new document in relation to the collection of documents based on the constructed passage-sequence model.

2. The method of claim 1, further comprising estimating a similarity between the new document and at least one document within the collection based on the determined sequence of operations.

3. The method of claim 1, wherein the method further comprises generating fingerprints for the first set of passages, and wherein at least one fingerprint corresponds to a state of the HMM.

4. The method of claim 3, further comprising generating fingerprints for the second set of passages, wherein the fingerprints for the second set of passages correspond to an observation sequence of the HMM.

5. The method of claim 4, further comprising calculating passage similarities by comparing the fingerprints of the second set of passages with the fingerprints of the first set of passages.

6. The method of claim 5, further comprising determining emission probabilities for the HMM based on the calculated passage similarities.

7. The method of claim 6, further comprising setting an emission probability for an additional state, which corresponds to creation of a new passage, based on a maximum emission probability of other states belonging to the HMM.

8. The method of claim 3, wherein the fingerprints of the first set of passages include two-dimensional visual fingerprints.

9. The method of claim 1, wherein determining the sequence of operations involves applying a Viterbi algorithm to the HMM.

10. A computer-readable storage medium storing instructions that when executed by a computer cause the computer to perform a method, the method comprising:
    selecting a collection of documents which includes a first set of passages;
    constructing a passage-sequence model based on the first set of passages, wherein the passage-sequence model is a hidden Markov model (HMM), wherein constructing the passage-sequence model involves determining transition probabilities between states of the HMM based on a sequential relationship associated with the first set of passages;
    receiving a new document which includes a second set of passages; and
    determining a sequence of operations associated with the new document in relation to the collection of documents based on the constructed passage-sequence model.

11. The computer-readable storage medium of claim 10, wherein the method further comprises estimating a similarity between the new document and at least one document within the collection based on the determined sequence of operations.

12. The computer-readable storage medium of claim 10, wherein the method further comprises generating fingerprints for the first set of passages, and wherein at least one fingerprint corresponds to a state of the HMM.

13. The computer-readable storage medium of claim 12, wherein the method further comprises generating fingerprints for the second set of passages, and wherein the fingerprints for the second set of passages correspond to an observation sequence of the HMM.

14. The computer-readable storage medium of claim 13, wherein the method further comprises calculating passage similarities by comparing the fingerprints of the second set of passages with the fingerprints of the first set of passages.

15. The computer-readable storage medium of claim 14, wherein the method further comprises determining emission probabilities for the HMM based on the calculated passage similarities.

16. The computer-readable storage medium of claim 15, wherein the method further comprises setting an emission probability for an additional state, which corresponds to creation of a new passage, based on a maximum emission probability of other states belonging to the HMM.

17. The computer-readable storage medium of claim 12, wherein the fingerprints of the first set of passages include two-dimensional visual fingerprints.

18. The computer-readable storage medium of claim 10, wherein determining the sequence of operations involves applying a Viterbi algorithm to the HMM.

19. A system, comprising:
    a selection mechanism configured to select a collection of documents which includes a first set of passages;
    a passage-sequence model construction mechanism configured to construct a passage-sequence model based on the first set of passages, wherein the passage-sequence model is a hidden Markov model (HMM), wherein the passage-sequence model construction mechanism is further configured to determine transition probabilities between states of the HMM based on a sequential relationship associated with the first set of passages;

a receiving mechanism configured to receive a new document which includes a second set of passages; and a determination mechanism configured to determine a sequence of operations associated with the new document in relation to the collection of documents based on the constructed passage-sequence model.

20. The system of claim 19, further comprising a similarity-estimation mechanism configured to estimate a similarity between the new document and at least one document within the collection based on the determined sequence of operations.

21. The system of claim 19, wherein the HMM includes a number of states corresponding to the first set of passages and an additional state corresponding to creation of a new passage.

* * * * *